(12) United States Patent  (10) Patent No.: US 7,830,628 B2
Schaefer  (45) Date of Patent: Nov. 9, 2010

(54) LENS AND DISPLAY ACCESSORY FOR PORTABLE IMAGING DEVICE

(76) Inventor: Glenn F. Schaefer, 21 W. Jefferson Rd., Pittsford, NY (US) 14534

( * ) Notice: Subject to any disclaimer, the term of this patent is extended or adjusted under 35 U.S.C. 154(b) by 245 days.

(21) Appl. No.: 12/253,367

(22) Filed: Oct. 17, 2008

(65) Prior Publication Data

US 2009/0109558 A1  Apr. 30, 2009

Related U.S. Application Data

(60) Provisional application No. 60/982,622, filed on Oct. 25, 2007.

(51) Int. Cl.
*G02B 7/02* (2006.01)
(52) U.S. Cl. ...................... 359/827; 359/819
(58) Field of Classification Search .................. 359/827
See application file for complete search history.

(56) References Cited

U.S. PATENT DOCUMENTS 4,533,212 A * 8/1985 Shimizu .................... 359/892
5,239,326 A    8/1993 Takai
6,760,544 B1 * 7/2004 Stiehler .......................... 396/6
2004/0252987 A1 12/2004 Kobayashi

OTHER PUBLICATIONS

Web page news story "Tiny Piezo Motors for Mobile Phone Camera Auto Focus and Optical Zoom"http://www.newscaletach.com/phone_camera.html Sep. 2008.
Web page news story New Scale Technologies Squiggle motor for cell phone cameras http://www.mpnow.com/news/x1577102503 By Morgan Wesson Monday Sep. 8, 2008.

* cited by examiner

*Primary Examiner*—Ricky L Mack
*Assistant Examiner*—James C Jones
(74) *Attorney, Agent, or Firm*—Tracy P. Jong

(57) ABSTRACT

The present invention relates to auxiliary detachable accessories associated with portable image capture and storage devices. Enhancements provided by the accessories include protective coverings for the integrated displays and integrated lenses, as well as the use of auxiliary conversion lenses that can be selectively attached to such devices to assist a user in enhancing in addition to creating artistic accentuations to the images.

20 Claims, 8 Drawing Sheets

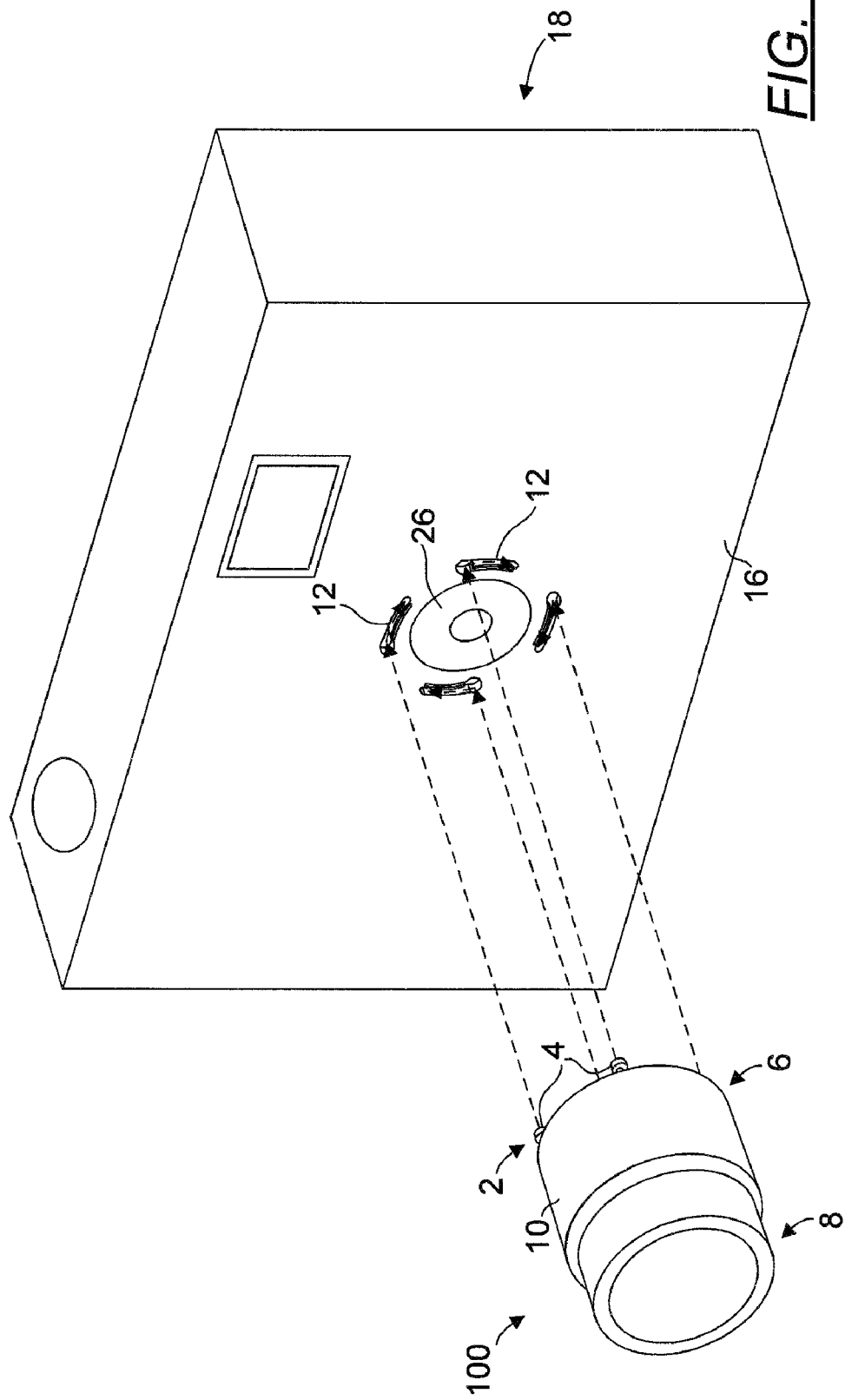

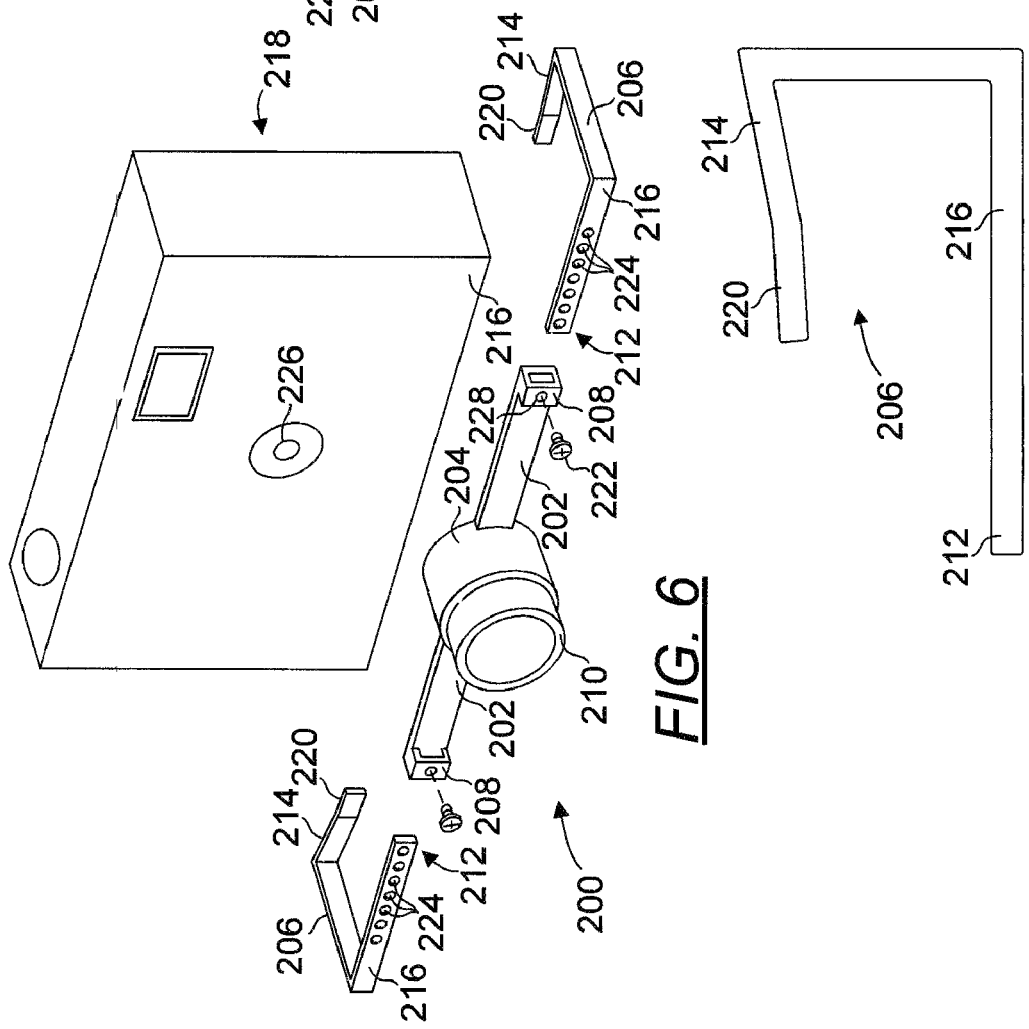
FIG. 6
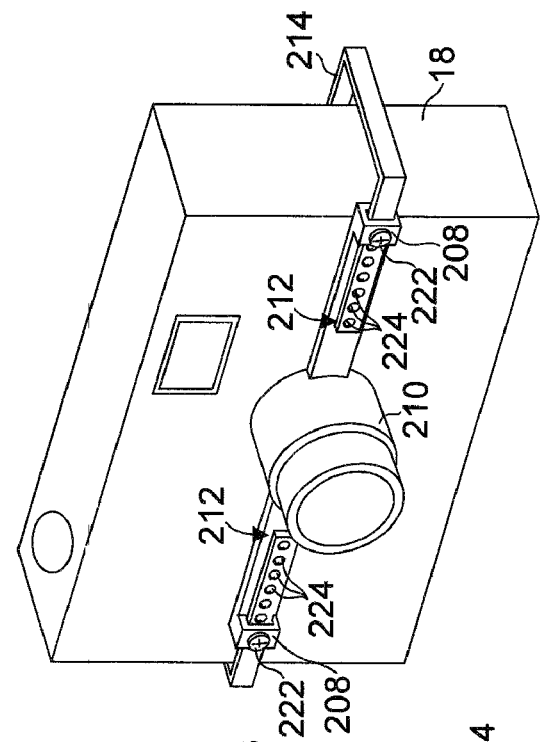
FIG. 7
FIG. 8

LENS AND DISPLAY ACCESSORY FOR PORTABLE IMAGING DEVICE

This application claims priority to U.S. Ser. No. 60,982,622 a provisional application filed by Glenn Schaefer on Oct. 25, 2007.

FIELD OF THE INVENTION

The present invention relates to auxiliary detachable accessories associated with portable image capture and storage devices including: disposable cameras, digital cameras, cellular telephones with a built-in camera or other devices with built-in cameras. Enhancements include protective coverings for the viewfinder type displays and built in lenses as well as the addition of a fixed focal length auxiliary conversion lenses that may be selectively attached to such devices to assist a user in taking close-ups (macro lens), panoramic views (wide-angle lens) and capturing long distance subjects (telephoto lens); creating artistic accentuations to the photographs are also possible with the use of special lenses, such as fisheye type lens, and the use of a lens in combination with a host of available filters.

BACKGROUND OF THE INVENTION

Disposable cameras and cellular telephone cameras have become very popular. However, current disposable cameras, low end digital cameras and cellular telephone cameras generally have a single lens with a fixed focal length. This single option does not allow the user to take advantage of the full array of image enhancements available via optical technology such as in composing: close-ups, panoramic, capturing long distance subjects, or artistic accentuations to the images. In addition, these types of portable devices are often used, carried, and stored, in inhospitable environments such as pockets, book bags, purses, etc., where keys, pens, etc. can easily scratch and damage sensitive display and lens components. Protective coverings for integrated displays (e.g. LCDs), lenses (mainly of plastic construction), and the like, are accessories with clear utility.

Higher end cameras often provide such features and with an interchangeable lens mounting scheme enabling a desired lens to be easily mounted to the camera body (e.g. macro, wide-angle, telephoto); creating artistic accentuations to the photographs are also possible with the use of special lenses, such as a fisheye type lens, and the use of lenses in combination with a host of available filters. More specifically, these higher end cameras generally have a lens-camera mounting technology (such as a bayonet or thread mounting schemes) allowing the auxiliary lens to be quickly mounted and dismounted to the camera body. Lens filters normally use the threaded portions about their perimeter to attach to a mating thread about the perimeter of the auxiliary lens. Many variations of the foregoing, as well as other configurations for coupling the auxiliary lens to the camera body are known in the art. Accordingly, these higher end cameras are selectively capable of telephotography, wide-angle photography, etc., as well as various filtering options. Disposable cameras, low end digital cameras, cellular telephone cameras, as well as other portable image capture and storage devices, however, normally have no interchangeable mounting hardware such as threaded portions (or other structures) for mounting filters and lenses, and thus, are unable to use these auxiliary lenses and filters, and are designed with a fixed focal length lens. This similar limitation is found in many other products containing built-in cameras.

U.S. Pat. No. 5,239,326 discloses a film-loaded disposable camera with an auxiliary lens detachably mounted on the camera body to enable the lens frame to be exchanged or interchanged with other lens frames with different types of lenses. This reference disclosed a weak mounting system, offers no dedicated lens or display protection, nor is it adaptable to lower end digital cameras or cellular telephones with built in cameras.

US20040252987A1 "AUXILIARY LENS FOR CAMERA AND THE LIKE" discloses an auxiliary lens for a camera comprising a washer and an auxiliary-lens body to be joined to the washer to thereby be mounted to the camera by a magnetic force. The auxiliary-lens body has an adhering section made of a permanent magnet, a ferromagnetic substance or a magnetic substance at the position to be mounted to the camera. The washer is made of a ferromagnetic substance, a magnetic substance or a permanent magnet that can adhere to the adhering section of the auxiliary-lens body. The shortcomings of this device include the fragile connection afforded by the small magnetic structures, allowing for frequent dislodging and/or shifting of the auxiliary lens during use.

Thus, it is desirable to provide an auxiliary lens and accessories that may be selectively and detachably mounted on a disposable camera, digital camera, cellular telephone with built-in camera or other device with a built in-camera.

SUMMARY OF THE INVENTION

The present invention discloses a lens and display accessory for portable imaging devices, more specifically, auxiliary lens and protective coverings which are selectively and detachably mounted onto the front of a camera housing covering the built-in lens, the protective coverings can also shield sensitive, easily scratched displays (such as LCD camera viewfinder) normally located on the back of such devices. The portable image capture and storage devices include, but are not limited to: disposable cameras, digital cameras, cellular telephones with a built-in camera, as well as other devices with built-in cameras. The use of auxiliary conversion lenses that may be selectively attached to such aforementioned portable image capture and storage devices can assist a user in composing close-ups (macro lens), panoramic views (wide-angle lens) and capturing long distance subjects (telephoto lens); creating artistic accentuations to the photographs is possible with the use of special lenses, such as fisheye type lens, and the use of a lens in combination with a host of available filters.

The present invention overcomes the shortcomings of the prior art by providing one or means for selectively, securing, and detachably mounting an auxiliary lens onto the front of a camera housing which was not designed to receive auxiliary lenses.

In accordance with this invention, and in one embodiment thereof, there is provided an auxiliary lens for a portable image capture and storage device that can be easily and quickly attached and detached from most any conventional disposable camera, digital camera, cellular telephone with built in camera, electronic gadgets with built-in cameras, or other portable image capture and storage devices.

A primary object of the present invention is to provide an auxiliary lens, filter and/or lens-filter combination that can be positioned between the subject of a photograph and the camera containing a built in lens such that the auxiliary lens selected will provide artistic accentuations to the photograph or selectively positioned in a camera's image optical path for effecting multiple scene images on a single camera frame or image file.

It is yet another object of the present invention to provide a user a convenient means of taking photographs of different types and with different effects and artistic accentuations.

It is yet another object of the present invention to provide an auxiliary lens for a portable image capture and storage device that may be mounted to portable image capture and storage devices of varying thicknesses and configurations.

It is yet another object of the present invention to provide an auxiliary lens for a portable image capture and storage device that is durable and reliable. It is yet another object of the present invention to provide a hard shell type case or sleeve for nonpermanent mounting on portable imaging devices, capable of receiving transparent protective shields for built in lenses and displays as well as being adapted to accept auxiliary lenses and the like.

It is yet another object of this invention to provide an auxiliary lens for a portable image capture and storage device that is relatively economical from the viewpoint of the manufacturer and consumer, is susceptible to low manufacturing costs with regard to labor and materials, and which accordingly is then susceptible of low prices for the consuming public, thereby making it economically available to the buying public.

It is a further object of the present invention to provide an auxiliary lens that can easily be mounted to cameras without threaded components and the like, in addition to cellular telephones with a built-in camera that are not designed for mounting of auxiliary lenses.

Another object of the present invention is to provide a disposable camera housing adaptable to receive an auxiliary special effect lens for selectively affecting the image. It is understood that the term disposable camera shall include other camera type such as single use cameras, recyclable cameras, and the like.

Yet another object of the present invention is to provide an auxiliary special effect lens or lens filter combination for affecting the primary scene on a single camera frame with special effects such as multiple images, halo effects, polarizing effects, and the like.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of the claims appended to this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

BRIEF DESCRIPTION OF THE DRAWINGS

The invention will be described by reference to the specification and the drawings, in which like numerals refer to like elements, and wherein:

FIG. 1A is a perspective view of an auxiliary lens for mounting on a camera;

FIG. 6 is a perspective view of an auxiliary lens and bracket portion assembly for mounting on a camera;

FIG. 7 is a perspective view of the embodiment depicted in FIG. 6 as mounted on a camera;

FIG. 8 is an orthogonal side view of a bracket portion of FIG. 6;

The drawings are not to scale, in fact, some aspects have been emphasized for a better illustration and understanding of the written description.

DETAILED DESCRIPTION OF A PREFERRED EMBODIMENT

The present invention relates to an auxiliary lens (e.g., a conversion lens and an optional filter) used for portable image capture and storage devices such as disposable and digital cameras and products with a built-in camera (e.g. cellular telephones and other electronic gadgets). More particularly, there is provided an interchangeable and detachable auxiliary lens comprising a conversion lens and a lens mount having a connecting portion at one end for mounting to a camera or interface between the auxiliary lens and camera structure.

Because camera devices are well known type of portable image capture and storage devices, the present description will be directed in particular to elements forming a part of, or cooperating with, apparatus in accordance with the present invention. It is understood that camera elements not specifically shown or described may take various forms well known to those skilled in the art.

As used in this application, an auxiliary lens shall mean a detachable prime fixed focal length secondary lens, filter, or lens-filter combination which is joined to a built in lens of a camera for changing the optical characteristic of the original camera lens, protecting the original built in camera lens, and/or providing a lens means to provide artistic accentuations to the photograph.

As used in this specification, portable image capture and storage device or camera shall mean a disposable camera, digital camera, cellular telephone with built-in camera or other device with a built in-camera, such devices having an objective lens for image formation; including the digital as well as the photographic film based types. Furthermore, disposable camera shall include other similar camera types such as single use cameras, recyclable cameras, use and mail camera, limited life inexpensive cameras and the like.

Specifically, the auxiliary lens according to the present invention provides similar optical benefits as that of a general conversion lens (e.g. focal length, angle of view, etc.) and includes most all conversion lenses associated the more sophisticated interchangeable lens types (e.g., telephoto lens, wide-angle lens, and the like, including accompanying filter components) used with higher end cameras. Lenses and the methods of making them are well known in the art. The improvement over the prior art that forms the essence of the present invention is in the method and structural components for mounting the auxiliary lens to a camera or portable image capture and storage device, specifically, the connecting portion at the distal end of the lens. Several embodiments will be described in greater detail.

Figure 1:
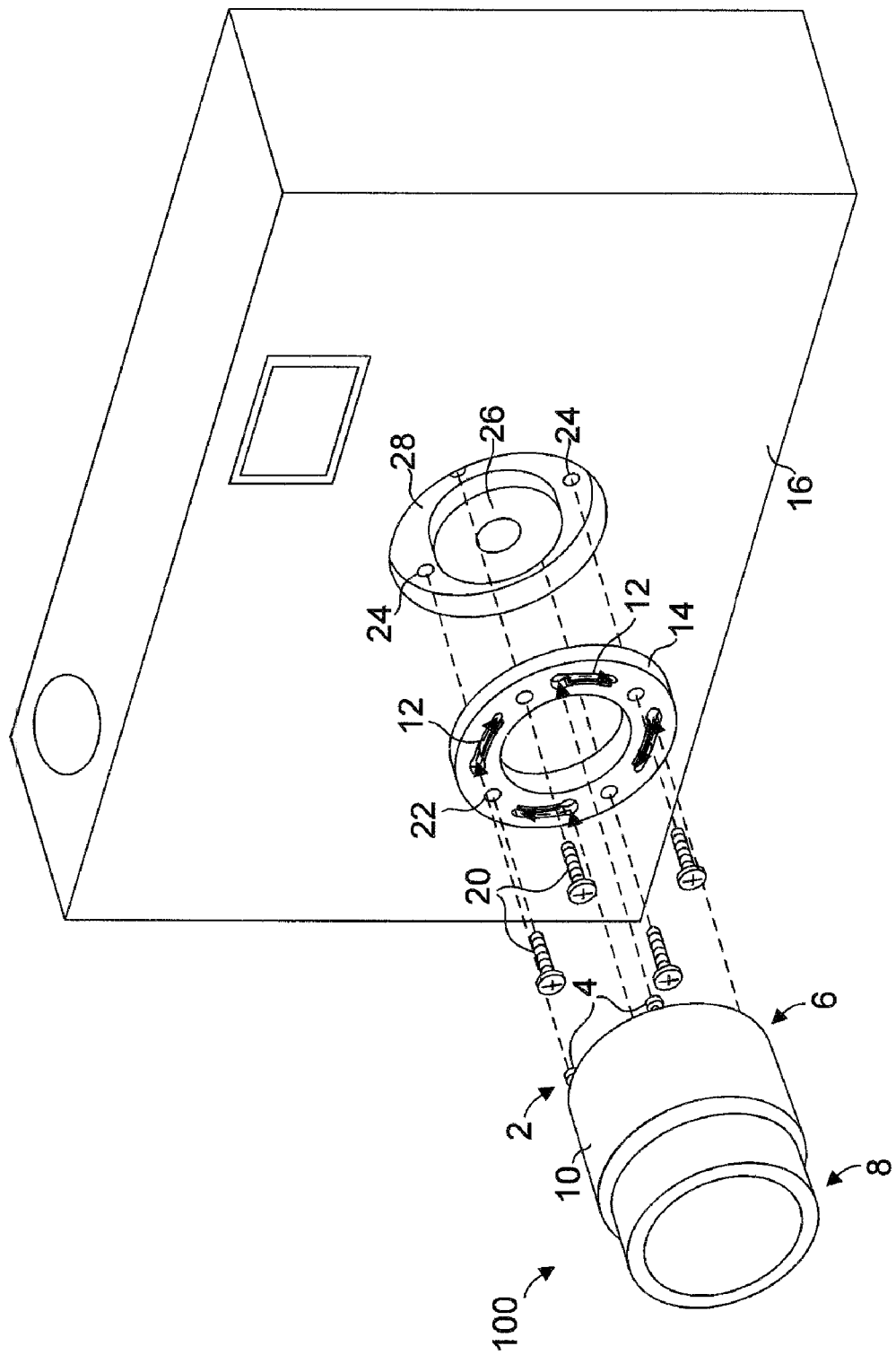
FIG. 1 is a perspective view of an auxiliary lens and mount lock member for mounting on a camera.
Figure 2:
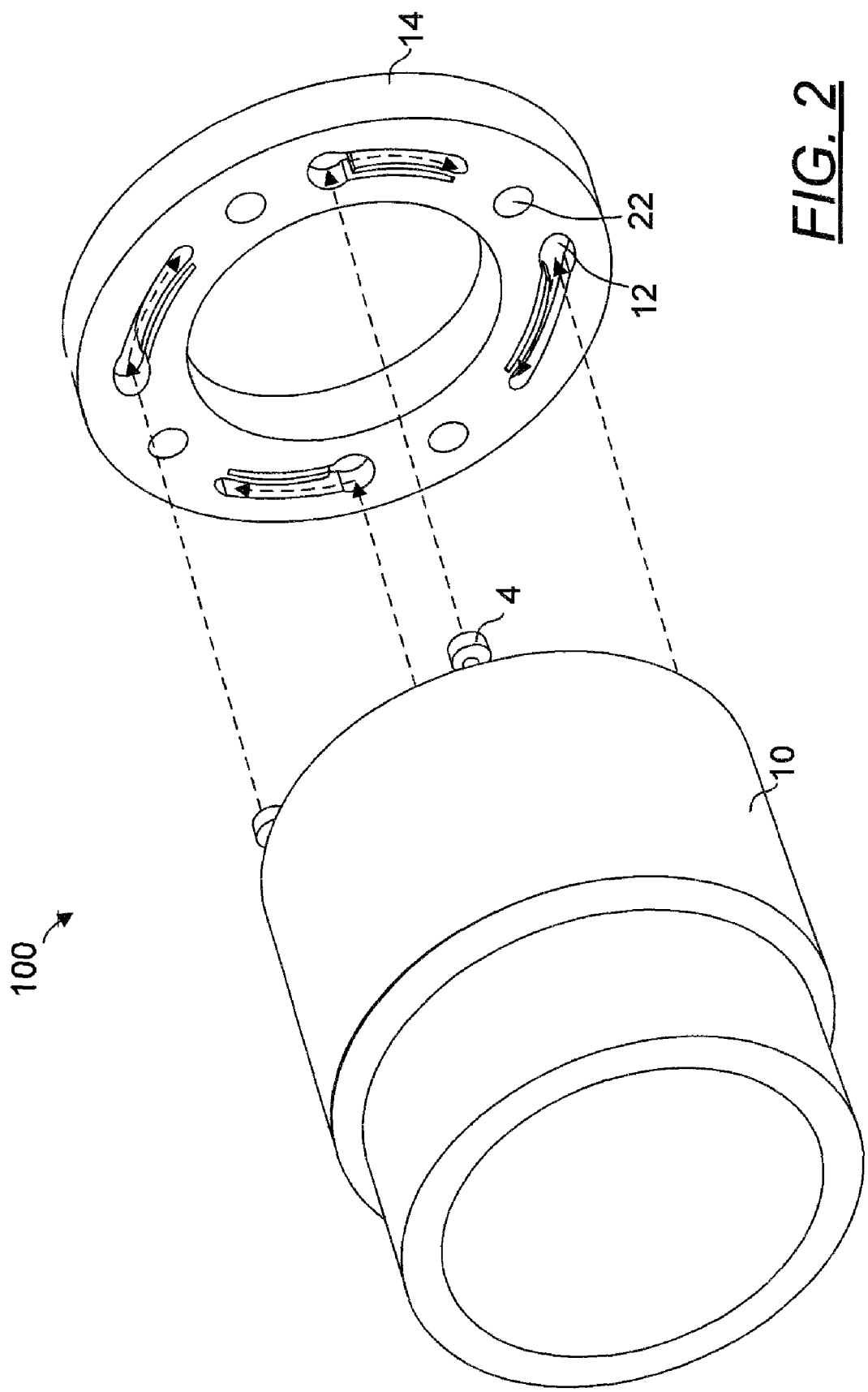
FIG. 2 is a perspective view of the auxiliary lens of FIG. 1.
Figure 5:
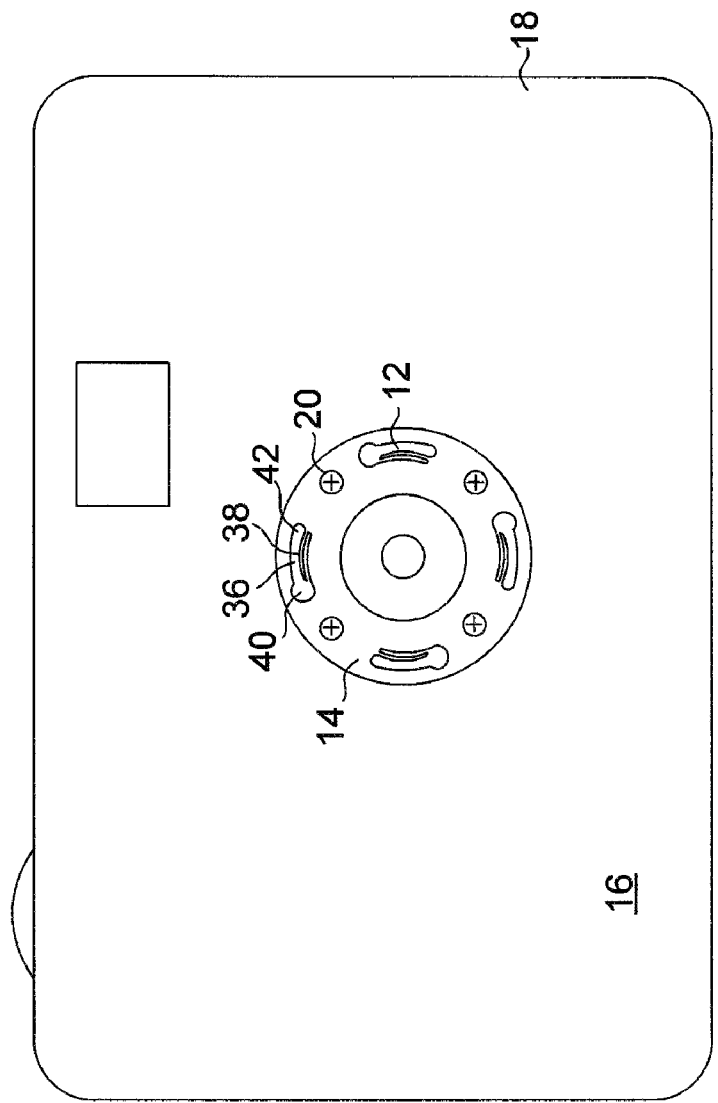
FIG. 5 is a front orthogonal view of the mount lock member of FIG. 1 mounted on a camera.
Figure 3:
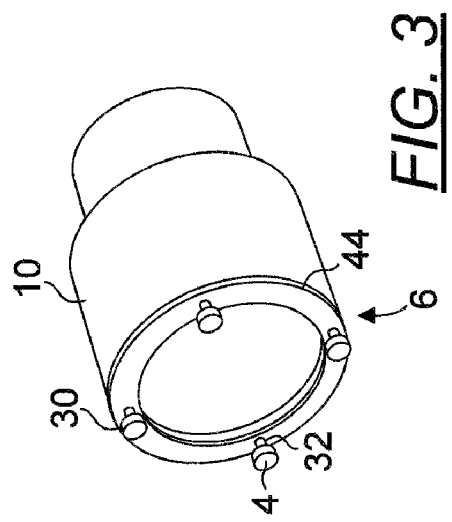
FIG. 3 is a rear perspective view of the auxiliary lens of FIG. 1.
Figure 4:
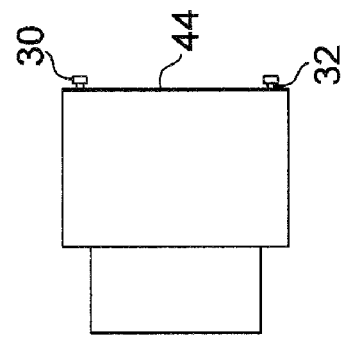
FIG. 4 is an orthogonal side view of the auxiliary lens of FIG. 1.

In embodiment 100 depicted in FIG. 1, the connecting portion 2 comprises a plurality of prongs 4 projecting from the distal side 6 of the lens body 10 that are configured to be received in a plurality of mating lock holes 12 on a mount lock member 14. The mount lock member 14 is affixed to the front 16 of a range finder fixed focus lens camera body 18. FIGS. 1, 2, 3, 4 and 5 illustrate one aspect of this embodiment. FIG. 2 is a perspective view of the lens body and mount lock member 14 assembly of FIG. 1. FIG. 3 is a rear perspective view of the auxiliary lens of FIG. 1. FIG. 4 is an orthogonal side view of the auxiliary lens of FIG. 1. FIG. 5 is a front orthogonal view of the mount lock member of FIG. 1 mounted on a camera.

In the aspect of the embodiment 100 depicted in FIG. 1, a mount lock member 14 is affixed to the front 16 of a camera body 18 with mechanical fasteners 20. The mount lock member 14 may be permanently or detachably affixed to the front face 16 of the camera body 18. In the embodiment 100 depicted, screws are inserted into a plurality of apertures 22 along the periphery of the mount lock member 14 and into mating threaded apertures 24 in the portion 28 of the camera body 18 surrounding the lens 26 of the camera. It is contemplated that other mechanical fasteners may be suitably used, including but not limited to push pin type and pressure/compression fit fasteners. It is also contemplated that mechanical fasteners may be supplemented by magnetic or adhesive components. Alternatively, adhesive materials may be used to affix the mount lock member 14 to the front face 16 of the camera body 18 about the lens 26.

FIG. 1A depicts the auxiliary lens of FIG. 1 for mounting on a camera that was molded or integrally formed with structural components designed to accept the auxiliary lens. Thus, the mount lock member 14 is not necessary. As will be apparent to those skilled in the art, the camera body may take many shapes and configurations to perform this function and are considered within the scope of the present invention.

Referring to FIGS. 1-5, the plurality of prongs 4 are equidistantly disposed about the exterior peripheral face 34 of the distal end 6 of the lens body 10. Each prong 4 comprises a narrow cylindrical shaft 32 with a head 30 at one end. The head 30 may be flattened or rounded and is configured and sized to mate with the lock holes 12 on a mount lock member 14.

Referring to FIG. 5, a lock hole 12 comprises an opening or a channel with a clothespin shape such that the opening is wider at the opposing ends with a narrower channel 36 there between. A spring member 38 secures shaft 32 of the prong 4 in the second end 42. More specifically, head 30 prevents auxiliary lens forward movement, while member 32 hinders clockwise as well as counterclockwise movement.

To mount the auxiliary lens 100, the prongs 4 are inserted in the first end 40 of the lock holes 12 such that the heads 30 pass through the lock holes 12 and exit the opposite side. The lens body 10 is rotated in the direction of the second end 42 of the lock holes 12, causing the cylindrical shafts 32 of the prongs 4 to depress the spring member 38 such that the cylindrical shafts 32 of the prongs 4 pass through the channels 36 toward the second end 42. The spring members 38 return to their resting position, securing the prongs 4 in the second end 42 of the lock holes 12. The rotation lens body 10 in the direction of the first end 40 of the lock holes 12 causes the prongs 4 to depress the spring members 38, allowing the prongs 4 to pass through the channels 36 toward the first end 40 of the lock holes 12; at completion, the spring elements 38 return to their resting position. Thus, the auxiliary lens 100 is configured to accept a connecting section 2 of the auxiliary lens to a mount lock member 14 through a clockwise rotation of the lens body 10, and to disconnect the same through a counterclockwise rotation of the lens body 10.

Consequently, the auxiliary lens becomes free to rotate. Therefore, the auxiliary lens can be detached from the camera body 10 by rotating the same by a predetermined angular displacement in the direction opposite to that when it is attached to the camera body 10.

The inverse relationship may also be suitably used such that the prongs 4 are disposed on the mount lock member 14 and the lock holes 12 are disposed on the distal end 6 of the lens body 10.

Figure 2A:
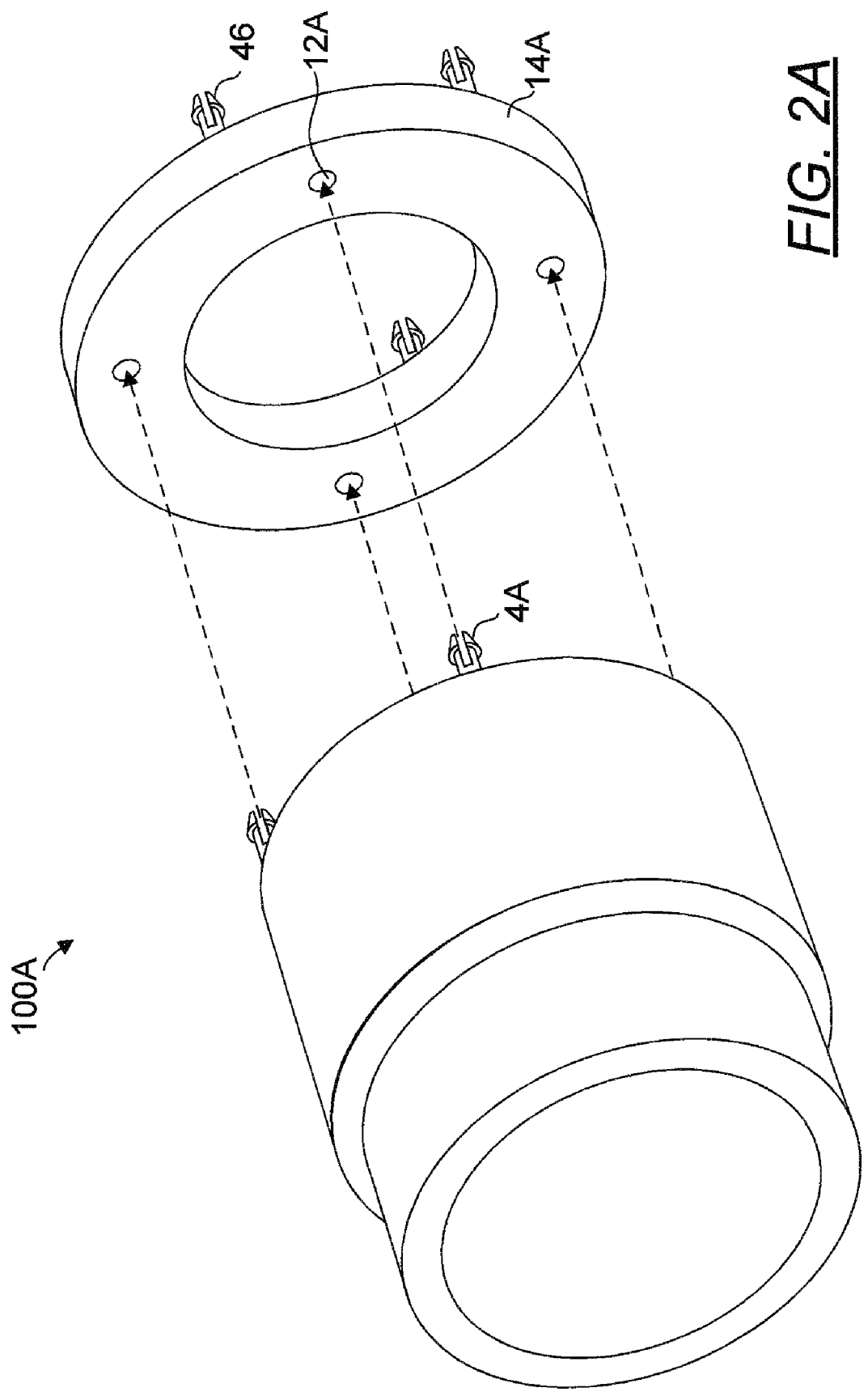
FIG. 2A is a perspective view of an alternate embodiment of an auxiliary lens and mount lock member.

FIG. 2A depicts an alternate embodiment 100A of an auxiliary lens and mount lock member 14A. This embodiment 100A is substantially the same as depicted and described with respect to embodiment 100 except the lock holes 12A receive compression fit prongs 4A. Additionally, mount lock member 14A is affixed to the front face of a camera body by a plurality of compression fit prongs 46A. In this aspect, the auxiliary lens is not detachable after mounting. Such a configuration is preferably used with a disposable auxiliary lens on a disposable camera.

As will become apparent, various features of the several embodiments may be interchangeably used with one another. By way of illustration, the compression prongs 4A of mount lock member 4A (FIG. 2A) may be incorporated in mount lock member 14 (FIGS. 1 and 2), replacing mechanical fasteners 20 and apertures 22. Mount lock member 14 may still incorporate the lock holes 12 and receive prongs 4 as depicted and described with respect to embodiment 100. It is understood that both the mount lock member 14 and/or lens body 10 can possess a mount once property where the user attaches the mount lock member 14 and/or lens body 10 to its mating surface such that once mounted, the device essentially becomes irremovable and a permanent resident of the overall assembly. This can be accomplished by the use of a properly designed fastener, for example, compression prongs 4A of mount lock member 4A (FIG. 2A) where properties including the lateral spring forces in combination with the prong's maximum diameter yields an insert once, irremovable thereafter scenario. Such a scenario would be desirable where one wishes to promote recurring sales, and/or encourage the return of accessories for recycling, reuse, and the like.

Referring to FIGS. 3 and 4, an O-ring seal 44 is preferably disposed in contacting engagement with the peripheral surface 34 of the distal end 6 of the lens body 10. Preferably, the O-ring 44 seal comprises a resilient material such as an elastomer, rubber like polymeric material, or silicone. A deformable and resilient surface allows for a tight fit between the lens body 10 and the mount lock member 14 (or camera body when the camera is molded to accept the auxiliary lens), preventing light, as well as contamination such as dust, dirt, water, etc. from entering the internal areas of the system components.

Figure 9:
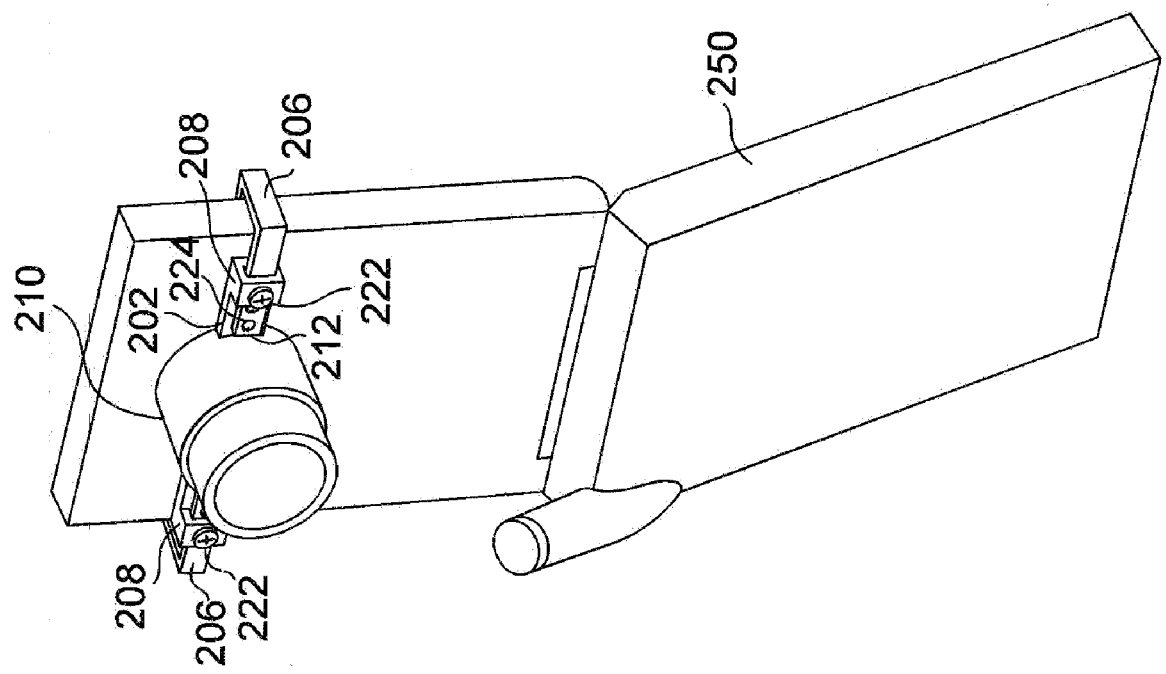
FIG. 9 is a perspective view of the embodiment depicted in FIG. 6 as mounted on a cellular telephone camera.

In one embodiment 200 depicted in FIG. 6, the connecting section 202 comprises two arms projecting from opposing sides of the lens body 210. These arms 202 each have a receptacle 208 at the end of the arm 202 projecting away from the lens body 210 that is configured to receive one end 212 of a bracket portion 206. FIGS. 6, 7, and 8 illustrate this embodiment 200. FIG. 7 depicts this embodiment 200 as mounted on a camera 218 and FIG. 8 is an orthogonal view of a bracket portion 206. FIG. 9 depicts this embodiment 200 as mounted on a cellular telephone 250 camera.

Referring to FIG. 6, bracket portion 206 is attached to both right and left sides of camera end lens barrel 204, and comprises a flat plastic strip configured to form a U-shaped member with the rear leg 214 biased inwardly toward the front leg 216. The tip 220 of the rear leg 214 is bent slightly back such that it lies flush against the rear face of the camera body 218 when mounted thereon. When mounted on a camera 218, the front leg 216 of the bracket portion 206 is in contacting engagement with the front face 216 of the camera body 218 and the tip 220 of the rear leg 214 is in contacting engagement with the rear face of the camera body 218. The rear leg 214 is biased inwardly and secures the bracket portion 206 around the camera body 218 in a clamp-like fashion.

Along the front leg 216 of the bracket portion 206 are disposed a plurality of adjusting apertures 224 that allow the bracket portion 206 to be adjustably affixed to an arm for a snug fit around the camera body 218.

To mount the auxiliary lens to a camera, the bracket portion 206 is disposed around the camera body 218 and the front leg 216 is inserted into the receptacle 208 in a manner that the lens is in operable optical and focal alignment with the camera lens and the bracket portion 206 snugly surrounds the camera body 218. A mechanical fastener 222 is inserted into an aperture 228 in the receptacle 208 such that it passes through one of the adjusting apertures 224 in the front leg 216 and secures it therein. The mechanical fastener 222 may be a threaded member (e.g., a screw) or a compression fit fastener.

As will be apparent to those skilled in the art, other suitable configurations may be employed to perform the same function of adjustably affixing the bracket portion 206 to the arm of the connecting section 202 and are contemplated as within the scope of the present invention.

Figure 10:
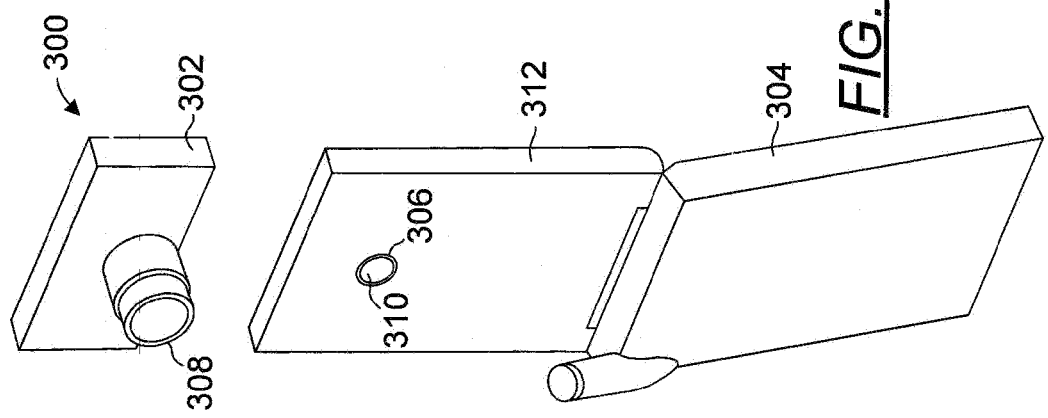
FIG. 10 is a perspective view of an auxiliary lens for mounting on a cellular telephone with built in camera.

As depicted in FIGS. 9 and 10, the typical cellular telephone 250, and 304 are "flip-up" style telephone that opens to a substantially rectilinear configuration and is sized to readily fit in a person's hand or a pocket. Typical cellular telephones have antennae extending upwardly from an upper surface thereof on one side, a front facing panel having a speaker on an upper end thereof, a power button, a display screen and a pressable keypad for exposing alphanumeric keys, and a lower microphone adjacent to its lowermost edge to obtain the shortest reasonable distance to the users mouth during use. The lens in devices having built-in cameras is typically located on the back side of such a device situated just behind the display panel (in an attempt to mimic a classical camera design). There are many cellular telephone devices with built-in cameras, each having its own contours and configurations of specific elements and an auxiliary camera lens assembly with the variations of the present invention may be formed to integrate with all or most of such cellular telephone devices with built-in cameras.

Figure 12:
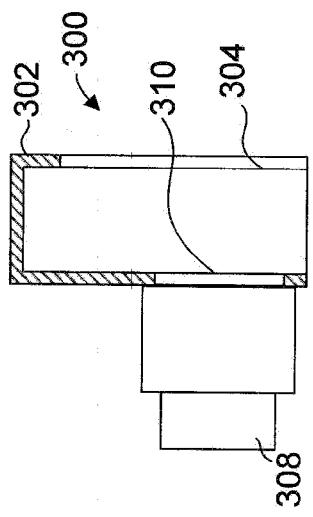
FIG. 12 is an orthogonal side view of the auxiliary lens of FIG. 10 as mounted on a cellular telephone with built in camera.
Figure 13:
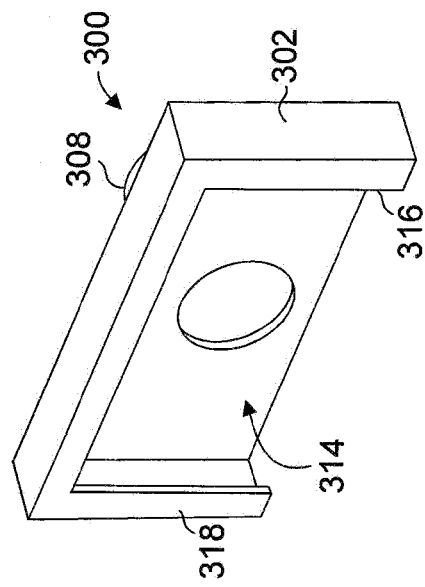
FIG. 13 is a rear perspective view of the auxiliary lens depicted in FIG. 10.
Figure 11:
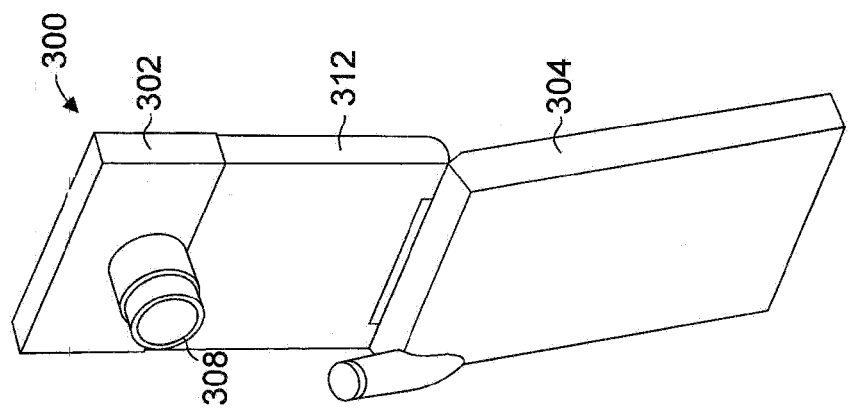
FIG. 11 is a perspective view of the auxiliary lens of FIG. 10 as mounted on a cellular telephone with built in camera.

In one embodiment 300 depicted in FIG. 10, the connecting section 302 comprises a sleeve configured to receive a cellular telephone 304 with a built-in camera 306 and dispose the auxiliary lens 308 in optical and focal alignment with the lens 310 of the cellular telephone's 304 built in camera 306. FIGS. 10, 11, 12 and 13 illustrate this embodiment 300. FIG. 11 is a perspective view depicting embodiment 300 mounted on a cellular telephone 304 with built in camera 306. FIG. 12 is an orthogonal side view depicting embodiment 300 mounted on a flip-up style cellular telephone 304 with built in camera 306. FIG. 13 is a rear perspective view of embodiment 300.

In the embodiment depicted, a sleeve is generally designated 302 and has a general size and shape corresponding to the general size and shape of the flip cover 312 of the cellular telephone 304 to which it is designed to correspond. The sleeve 302 is arranged for cooperating engagement with the cellular telephone's flip cover 312 in an overlapping alignment with the portion containing the built-in camera. It will be recognized by those skilled in the art that the sleeve piece may be of configurations, shapes and sizes other than those illustrated herein. There are many cellular telephone devices with built-in cameras, each having its own contours and configuration of specific elements. A sleeve of the present invention is formed with appropriate contours, cutouts, and openings to integrate with all or most of such cellular telephone devices, including styles other than the flip-up version depicted in the Figures.

The peripheral walls of the sleeve 302 define an interior cavity or chamber 314 which mates with flip cover 312 arranged for carrying the cellular telephone 304 in cooperation with the built-in camera 310 and the auxiliary camera lens 308.

The sleeve 302 further includes one or more cutouts or openings 316 through the rear wall 318 surface. In the aspect depicted, there is provided a suitable screen window opening 316 for viewing the visible display of information presented on the LCD or other screen display of the cellular telephone when the sleeve 302 is engaged with the flip cover 312. In other aspects, there may be provided one or more cutouts or openings 316 through the rear wall 318 surface in a pattern corresponding to a single or an array of keys/buttons whereby the keys/buttons are accessible to the user. In some aspects, the sleeve 302 further includes suitable cutouts or openings 316 such that acoustic energy may be communicated to the microphone when the sleeve 302 is engaged with the flip cover 312. The sleeve 302 also includes suitable openings or apertures for the speaker such that audio or acoustic energy emitted from the speaker is communicated through the sleeve 302 when the sleeve 302 is engaged with the flip cover 312.

In one embodiment, one or more detents secures the sleeve 302 in place on the cellular telephone flip cover 312 such that once mounted, a simple lateral pull or push on the sleeve 302 as well as handling the phone in typical use scenarios cannot remove it from its mounted position. Additionally, the interior cavity can be fitted with a pliant polymeric material in addition to or instead of the detent feature to help align, secure, and retain sleeve 302 in place on the cellular telephone flip cover 312

Although the sleeve 302 embodying the invention is presented by way of illustration herein in cooperating engagement with the flip cover 312 in overlapping alignment with the built-in camera of the flip cover 312, the sleeve 302 may be implemented in any suitable and desired mechanical configuration to carry out the intended purpose.

The lens in embodiments 100, 200 and 300 is formed from an optical quality plastic or glass. The lens has a plurality of facets. In one aspect, the auxiliary lens or the lens body 10, 210, 308 has a visual symbol associated therewith for easy recognition by the user.

The lens body 10, 210, 308 may also be formed substantially of a polymeric material, metal, or other suitable material.

The sleeve 302 is preferably formed of rigid plastic material, preferably of relatively high strength which lends itself to the injection molding process. Other moldable plastics materials (e.g., 30% glass fiber filled nylon), polycarbonate, and even castable metal materials are options that can provide a desired aesthetic look and/or feel in addition to supplying preferred or target engineering properties such as thermal expansion, weight, creep, UV resistance, etc. for specific users and/or environments.

What is claimed herein is:

1. An auxiliary lens assembly for use with a portable image capture and storage device where said portable image capture and storage device possesses a front wall and an integrated optical lens thereon adapted to receive said auxiliary lens assembly, said auxiliary lens assembly comprising:
    a mount lock member having a first side and a second side, and further having a plurality of lens fastening means and a plurality of mount lock member fastening means both located about a periphery of said first side and said second side of said mount lock member;
    a mounting means for attaching said mount lock member to said front wall, centered over said integrated optical lens;
    a plurality of mechanical fasteners adapted to mate with a plurality of apertures about said periphery of said integrated optical lens, whereby said mount lock member, situated between said plurality of mechanical fasteners and said plurality of apertures, is secured to said front wall of said portable image capture and storage device; and
    an auxiliary lens comprising a first end which is aimed at photographic subjects, and a second end possessing a peripheral face which attaches to said mount lock member, said peripheral face of said second end having a plurality of auxiliary lens fastening means for detachably mounting said auxiliary lens to said mount lock member.

2. An auxiliary lens assembly as recited in claim 1, wherein said mount lock member is integrally formed onto said front wall of said portable image capture and storage device.

3. An auxiliary lens assembly as recited in claim 2, wherein said auxiliary lens is a user installed permanently attachable device, whereby said auxiliary lens becomes essentially irremovable once mounted.

4. An auxiliary lens assembly as recited in claim 1, wherein said auxiliary lens is substantially constructed from a polymeric material.

5. An auxiliary lens assembly as recited in claim 1, wherein said peripheral face of said second end of said auxiliary lens is fitted with an elastomeric sealing material.

6. An auxiliary lens assembly adapted for use with a portable image capture and storage device where said portable image capture and storage device has a front wall and an integrated optical lens thereon, said auxiliary lens assembly comprising:
    an auxiliary lens body comprising a first end which is aimed at photographic subjects, and a second end having a portable image capture and storage device lens barrel having a right and left side, and possessing a peripheral face which is adapted to cover said integrated optical lens, and having a right and a left connecting section each having a distal end thereof and respectively attached to said right side and said left side of said portable image capture and storage device end lens barrel, wherein each distal end of said right connecting sections and said left connecting section are each terminated with a right receptacle and a left receptacle each having an aperture that operates in conjunction with a mechanical fastener, and a right front leg and a left front leg each having a distal end and a proximate end thereof, wherein a right plurality of apertures and a left plurality of apertures are situated and cooperate respectively in conjunction with said right and left receptacles and said mechanical fasteners thereby enabling a user to center said auxiliary lens body over said integrated optical lens, wherein orthogonally connected to said distal right front leg and said distal left front leg is a right bracket portion and a left bracket portion each orthogonally connected to a right rear leg and left rear leg each concluding with a right attached tip and a left attached tip respectively, wherein both right and left said rear legs and right and left said tips all slope toward the direction of said plurality of apertures whereby a compression fit is created assisting in mounting said auxiliary lens assembly onto said portable image capture and storage device.

7. An auxiliary lens assembly as recited in claim 6, wherein a perimeter of said peripheral face of said auxiliary lens body is fitted with an elastomeric sealing material.

8. An auxiliary lens assembly as recited in claim 6, wherein said auxiliary lens is substantially constructed from a polymeric material.

9. A sleeve assembly adapted for use with a portable image capture and storage device, where said portable image capture and storage device has a front face and an integrated optical lens thereon, said sleeve assembly comprising:
    a rear wall attached to three side walls followed by an additional orthogonal connection to a front wall, thereby forming a rectilinear interior cavity with an open bottom; and
    an aperture located on said front wall of said sleeve configured such that said aperture is centrally aligned over said integrated optical lens of said portable image capture and storage device, thereby acting as a rigid shell structure capable of receiving accessories.

10. A sleeve assembly as recited in claim 9, wherein said aperture located on said sleeve is configured to receive and removably secure a transparent, substantially rigid material, thereby acting as a lens protector for said integrated optical lens of said portable image capture and storage device.

11. A sleeve assembly as recited in claim 9, wherein said aperture located on said sleeve is configured with a permanent transparent, substantially rigid material, thereby acting as a lens protector for said integrated optical lens of said portable image capture and storage device.

12. A sleeve assembly as recited in claim 9, wherein said aperture located on said sleeve is adapted to receive a removably attachable auxiliary lens body comprising a first end which is aimed at photographic subjects, and a second end having a lens barrel adapted to optically cooperate with said integrated optical lens.

13. A sleeve assembly as recited in claim 9, wherein said aperture located on said sleeve permanently incorporates an auxiliary lens body comprising a first end which is aimed at photographic subjects, and a second end having a lens barrel adapted to optically cooperate with said integrated optical lens.

14. A sleeve assembly as recited in claim 9, wherein at least a portion of said rectilinear interior cavity is fitted with a pliant polymeric material.

15. A sleeve assembly as recited in claim 9, wherein at least one area of said rectilinear interior cavity is fitted with a detent feature configured to removably secure said sleeve assembly to said portable image capture and storage device.

16. A sleeve assembly as recited in claim 10, wherein said back wall located on said sleeve assembly comprises a transparent, substantially rigid material, thereby acting as a rear display screen protector for said integrated optical lens of said portable image capture and storage device.

17. A sleeve assembly as recited in claim 11, wherein said back wall located on said sleeve assembly comprises a transparent, substantially rigid material, thereby acting as a rear display screen protector for said integrated optical lens of said portable image capture and storage device.

18. A sleeve assembly as recited in claim 9, wherein said back wall is substantially removed, thereby creating an opening that provides access to a back surface of said integrated optical lens of said portable image capture and storage device.

19. A sleeve assembly as recited in claim 9, wherein said sleeve assembly is substantially constructed from a polymeric material.

20. A sleeve assembly as recited in claim 13, wherein said auxiliary lens body is substantially constructed from a polymeric material.

* * * * *